(12) United States Patent
Cocks (10) Patent No.: US 7,315,945 B2
(45) Date of Patent: Jan. 1, 2008

(54) DIRECTORYLESS PUBLIC KEY CRYPTOGRAPHIC SYSTEM AND METHOD

(75) Inventor: Clifford Christopher Cocks, Cheltenham (GB)

(73) Assignee: The Director, GCHQ (GB)

( * ) Notice: Subject to any disclaimer, the term of this patent is extended or adjusted under 35 U.S.C. 154(b) by 914 days.

(21) Appl. No.: 10/451,003

(22) PCT Filed: Dec. 14, 2001

(86) PCT No.: PCT/GB01/05539

§ 371 (c)(1),
(2), (4) Date: Jun. 18, 2003

(87) PCT Pub. No.: WO02/51066

PCT Pub. Date: Jun. 27, 2002

(65) Prior Publication Data

US 2004/0240666 A1    Dec. 2, 2004

(30) Foreign Application Priority Data

Dec. 20, 2000  (GB) ................................ 0031320.5

(51) Int. Cl.
*H04L 9/00* (2006.01)
*G06F 17/30* (2006.01)
*H04K 1/00* (2006.01)
*G06K 9/00* (2006.01)

(52) U.S. Cl. ........................ 713/171; 713/170; 713/182; 726/2; 380/255; 380/277; 380/282; 380/283

(58) Field of Classification Search ................ 713/171; 380/282, 283, 285
See application file for complete search history.

(56) References Cited

U.S. PATENT DOCUMENTS 5,150,411 A * 9/1992 Maurer ........................ 380/30

(Continued)

FOREIGN PATENT DOCUMENTS

EP    0482233    4/1992

(Continued)

OTHER PUBLICATIONS

Shamir, 1998, Department of Applied Mathematics, p. 47-52.*

(Continued)

*Primary Examiner*—Christopher Revak
*Assistant Examiner*—Jeremiah Avery
(74) *Attorney, Agent, or Firm*—Dean W. Russell; Kilpatrick Stockton LLP (57) ABSTRACT

A method of operating an identity based directoryless keycode cryptographic communication system having two users A and B and a universal authority U, involving the generation of a public modulus M, being the product of two primes P and Q, and the operation of a publicly available secure one way hash function, #. User A presents his identity to U who uses #, M, P and Q to generate a decryption key, r, which is only made available to A. User B, who wishes to transmit a message to A, can encrypt data by using the #, M and A's identity. User A can recover the data by using r.

8 Claims, 2 Drawing Sheets

---

User B to send message to User A

User B  —— $s, s'$ ——▶  User A

Knows: $ID_A, \#, M(, x)$
Calculates: 1) $a(, -a \text{ or } xa)$

2) $s = t + \frac{a}{t} \mod M$, where $t$ is random but $\left(\frac{t}{M}\right) = b$ (the cryptovariable) $= +1$ or $-1$ 3) $s' = t' - \frac{a}{t} \mod M$, if $P, Q$ congruent to 3 mod 4 or, $s' = t' + \frac{xa}{t} \mod M$, if $P, Q$ not congruent to 3 mod 4

Knows: $r, M(, x)$
Receives: $s, s'$
Computes: $b = \left(\frac{s + 2r}{M}\right)$ or $b = \left(\frac{s' + 2r}{M}\right)$

U.S. PATENT DOCUMENTS

| | | | | |
|---|---|---|---|---|
| 5,218,637 | A | * | 6/1993 | Angebaud et al. .......... 713/173 |
| 5,315,658 | A | * | 5/1994 | Micali ........................ 380/286 |
| 6,687,822 | B1 | * | 2/2004 | Jakobsson .................. 713/156 |
| 6,760,752 | B1 | * | 7/2004 | Liu et al. .................... 709/206 |
| 2003/0076954 | A1 | * | 4/2003 | Vanstone et al. ............. 380/28 |
| 2003/0091192 | A1 | * | 5/2003 | Chen et al. ................. 380/277 |

FOREIGN PATENT DOCUMENTS

| | | | | |
|---|---|---|---|---|
| EP | | 0973293 A2 | * 7/1999 | ................ 380/277 |
| EP | | 973293 A2 | * 1/2000 | |

OTHER PUBLICATIONS

Maurer and Yacobi, 1991, Lecture Notes in Computer Science, vol. 547.*

Chen, Kefer. "Authenticated Encryption Scheme Based On Quadratic Residue". Electronic Letters. vol. 34, Issue 22. Oct. 1998. pp. 2115 and 2116. Found on the World Wide Web at: http://ieeexplore.ieee.org/iel4/2220/15941/00741318.pdf?tp=&arnumber=741318&isnumber=15941.*

A. Fiat, et al., "How To Prove Yourself: Practical Solutions to Identification and Signature Problems," Lecture Notes in Computer Science, 186-194, no date provided.

* cited by examiner

Fig.1.

Universal Authority U
Knows: #,P,Q(,x)
Receives: $ID_A$
Calculates: M,a,r
Publishes: #,M(,x)

User A
Knows: #,M,$ID_A$(,x)
Receives: r

Note: "x" is an integer which is only relevant for cases where P and Q are not congruent to 3 mod 4

DIRECTORYLESS PUBLIC KEY CRYPTOGRAPHIC SYSTEM AND METHOD

CROSS REFERENCE TO RELATED APPLICATIONS

This application is the U.S. national phase of International Application No. PCT/GB01/05539 filed on Dec. 14, 2001 published in English as International Publication No. WO 02/51066 A1 on Jun. 27, 2002, and Great Britain Application No. 0031320.5 filed on Dec. 20, 2000, the contents of which are hereby incorporated by reference.

The present invention relates to asymmetric key-code cryptographic communications systems and methods and in particular to identity based systems wherein the user's identity, for example his email address, is used to work out an encryption function.

Many applications, such as electronic banking and email systems, require the transfer of information between microprocessors over communications channels. In such applications it is preferable to encrypt information passing over the communications channel to prevent unauthorised disclosure of the information.

Cryptographic functions may be implemented in a microprocessor controlled communications system by the use of either symmetrical or asymmetrical algorithms.

In an symmetrical algorithm system a user makes universally available a single "public" key to anyone wishing to send the user a message. The user retains a decryption key, the so-called "private" key, which is related in some way to the public key. A well-known asymmetrical algorithm based communications system is the RSA algorithm (U.S. Pat. No. 4,405,829).

In public/private key encryption systems it is necessary to know the public key of the recipient of the message. In an online system, for example a telephone system, recipients can send their public key as and when it is required to enable someone to send them encrypted messages. However, in an offline system, for example an email system, the need to know the public key necessitates the holding of directories of public keys.

In an identity based system (an asymmetrical system) it is possible to avoid the need for a separate public key directory by making a user's public key a function of his identity, for example his email address.

The possibility of an identity based system was first proposed in a paper by A. Shamir (Identity-based cryptosystems and signature schemes, Advances in Cryptology—CRYPTO '84, Lecture Notes in Computer Science, vol. 196, Berlin: Springer Verlag, pp47-53, 1985). The paper discussed a cryptographic scheme which would enable a pair of users to communicate securely and also verify each other's signatures without exchanging public keys, without keeping key directories and without using the services of a third party. The scheme assumed the existence of a key generation centre who would generate a user's decryption key from any combination of the user's name, address, telephone number etc. provided it uniquely identified the user in a way that could not be denied. Shamir acknowledged, however, that his identity based scheme could not be implemented using the RSA scheme. Either it was computationally impossible for the key generation centre to calculate the private key or users could determine supposedly hidden properties of the scheme from their own public and private keys.

An identity based non-interactive public key distribution system was also proposed by Maurer and Yacobi (U. Maurer and Y. Yacobi, *Non-Interactive Public Key Cryptography Advances in Cryptology*—Proceedings of Eurocrypt '91). The system proposed, however, required considerable computational effort on the part of the trusted key generation authority.

A further key distribution system based on identification information is described by Okamoto (E. Okamoto, *Key Distribution Systems Based on Identification Information*, Advances in Cryptology—Proceedings of Crypto '87). Okamoto proposed two types of system, the first for decentralised networks (where users communicate directly with one another) and the second for centralised networks (which require a network centre to function). This system was not truly directoryless, however, since the user's identity was used only as part of the key generation process and so a public directory was still needed for offline communication between users.

It is the object of the present invention to provide a workable directoryless public key system.

The object of the present invention is achieved by considering two users A and B and a universal authority U, involving the generation of a public modulus M; where in a first embodiment M is the product of two primes P and Q which are both congruent to 3 mod 4, and a publicly available secure one-way hash function # is operated, characterised by the following steps:

i) having U determine the public modulus M;

ii) having U apply the # to A's identity to produce a value a modulo M such that the Jacobi symbol $$\left(\frac{a}{M}\right)$$

is +1 and then to calculate the square root modulo M of a or −a and supply a resulting root, r, to A;

iii) having B compute a and transmit a bit of cryptovariable b to A encrypted as s=(t+a/t)mod M, where t is a random number modulo M such that the Jacobi symbol $$\left(\frac{t}{M}\right) = b$$

and b is coded as either +1 or −1;

iv) having user B retransmit the bit of cryptovariable b to A encrypted as $$s' = \left(t' - \frac{a}{t'}\right) \bmod M,$$

where t' is a different random number modulo M to t such that $$\left(\frac{t'}{M}\right) = \left(\frac{t}{M}\right) = b;$$

v) having user A recover cryptovariable bit b by computing $$b = \left(\frac{s+2r}{M}\right) \text{ or } b = \left(\frac{s'+2r}{M}\right).$$

A second embodiment of the invention details a similar directoryless key-code cryptographic communication system also employing the publicly available # and where one or both of the primes P and Q are congruent to 1 mod 4. In this case the invention is characterised by the following steps:
  i) having U determine the public modulus M;
  ii) having U find and publish an integer x such that x is not a square modulo P nor Q;
  iii) having U apply the # to A's identity to produce a value a modulo M such that the Jacobi symbol $$\left(\frac{a}{M}\right)$$

is +1 and then to calculate the square root modulo M of a or xa and supply a resulting root, r, to A;
  iv) having B compute a and transmit a bit of cryptovariable b to A encrypted as s=(t+a/t)mod M, where t is a random number modulo M such that the Jacobi symbol $$\left(\frac{t}{M}\right) = b$$

and b is coded as either +1 or −1;
  v) having B retransmit the bit of cryptovariable b to A encrypted as $$s' = \left(t' + \frac{xa}{t'}\right) \text{mod } M,$$

where t' is a different random number modulo M to t such that $$\left(\frac{t'}{M}\right) = \left(\frac{t}{M}\right) = b;$$

vi) having A recover cryptovariable bit b by computing $$b = \left(\frac{s+2r}{M}\right) \text{ or } b = \left(\frac{s'+2r}{M}\right).$$

A third embodiment of the invention describes how the system can be worked without the need for the re-transmission of data described in previous embodiments. This uses M, the product of any two non-even primes, and also uses the # function and is characterised by the following steps:
  i) having U determine the public Modulus M;
  ii) having U apply the # to A's identity to produce a value a Modulo M such that the Jacobi symbol $$\left(\frac{a}{M}\right)$$

is +1 and then to calculate the square root modulo M of a, −a or xa where x, which is an additional publicly available system parameter, is an integer which is neither square modulo P nor Q, and to supply a resulting root, r, to A;
  iii) having U publish whether A has received a root of +a, −a or xa;
  iv) having B compute a and:
    (I) if A has received a root of +a: transmit a bit of cryptovariable b to A encrypted as s=(t+a/t)mod M, where t is a random number modulo M such that the Jacobi symbol $$\left(\frac{t}{M}\right) = b$$

and b is coded as either +1 or −1;
    (II) if A has received a root of −a: transmit a bit cryptovariable b to A encrypted as s'=(t−a/t)mod M, where t is a random number modulo M such that the Jacobi symbol $$\left(\frac{t}{M}\right) = b$$

and b is coded as either +1 or −1;
    (III) if A has received a root of xa: transmit a bit cryptovariable b to A encrypted as $$s'' = \left(t + \frac{xa}{t}\right) \text{mod } M,$$

where t is a random number modulo M such that the Jacobi symbol $$\left(\frac{t}{M}\right) = b$$

and b is coded as either +1 or −1;
  v) having A recover cryptovariable bit b by computing $$b = \left(\frac{s+2r}{M}\right) \quad \text{(I)}$$

$$b = \left(\frac{s'+2r}{M}\right) \quad \text{(II)}$$

$$b = \left(\frac{s''+2r}{M}\right). \quad \text{(III)}$$

In the above embodiments the users' identities may be based upon their email addresses, optionally together with the current date.

In a further useful variant of the present invention, the responsibility for generating the public modulus M is split between two or more universal authorities. Such a split key cryptographic system is described in GB Patent Application 9715761.4 (filed 28$^{th}$ Jul. 1997) and in *Split Knowledge Generation of RSA Parameters* by C Cocks (From Proceedings of 6$^{th}$ IMA Conference on Cryptography and Coding, Cirencester, December 1997, Published by Springer Verlag, Lecture Notes in Computer Science vol.1355). This variant has the advantage of added security since no-one authority holds all the information necessary to intercept and de-code messages.

Methods of working the invention may be effected by using microprocessors.

In a particularly advantageous arrangement of the invention, providing the opportunity to reduce bandwidth without compromising security of the system, only a message header section which precedes the main message is encrypted in accordance with a method as described above while the main message is encrypted by means of a standard technique. The message header is then used to detail which of a number of standard encryption techniques is to be used in the main message. This will result in the overall encryption system being computationally less expensive than one encrypting the whole message.

Examples according to the present invention will now be described with reference to the accompanying figures, in which.

EXAMPLE 1

Figure 1:
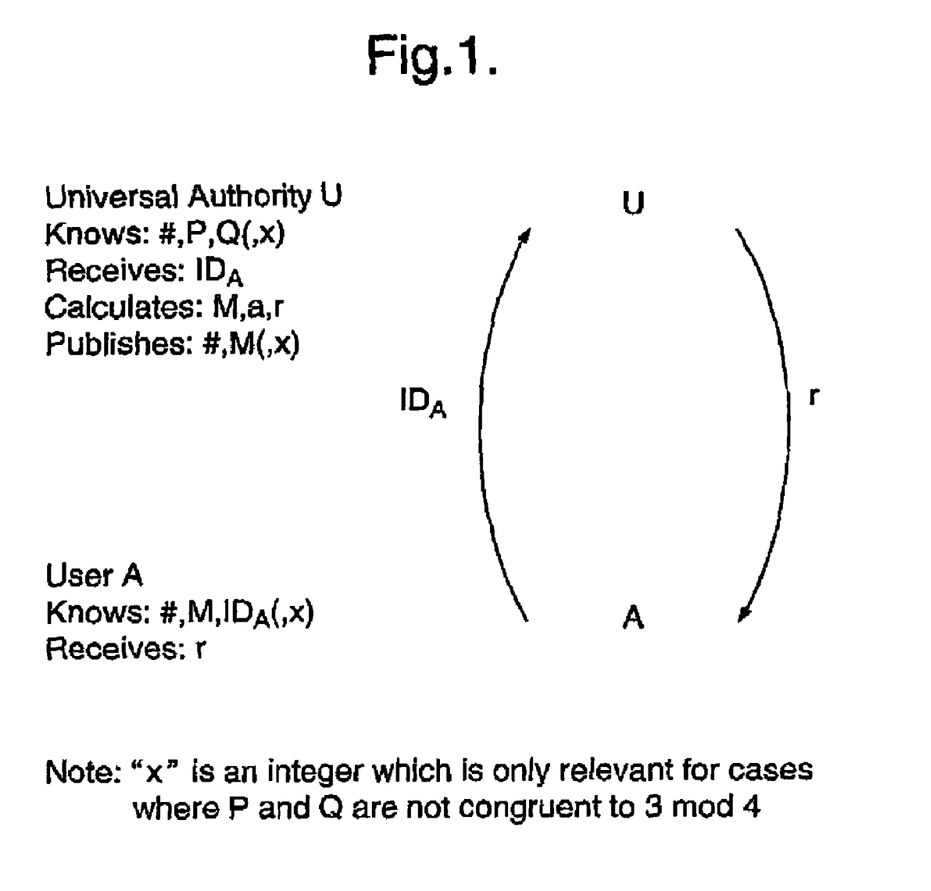
FIG. 1 is a functional representation of the registration process.

(I) (FIG. 1) To begin a universal authority U generates a universally available public modulus M which is the product of two primes P and Q, which are known by U only, where P and Q are both congruent to 3 mod 4. P and Q are chosen to be very large to make it computationally unfeasible to factorise M. A first user A then presents his identity to U and a publicly known secure one-way hash function (hereinafter referred to as the "hash function") is applied to A's identity to produce a value a modulo M such that the Jacobi symbol $$\left(\frac{a}{M}\right)$$

is +1'. The process essentially involves the multiple application of the hash function in a structured way to produce a set of candidate values for a, stopping when $$\left(\frac{a}{M}\right) = +1.$$

The correct operation of the hash function on a recipient's identity will be evident from the hash function itself and can be replicated by anyone holding the universal parameters and A's identity. U can calculate the square root modulo M since he knows P and Q, and he presents one of the four possible roots, r, to A. It should be noted tat it is essential that only one of the roots r is ever released to ensure that the integrity of the system is not compromised. This root r will later enable A to decrypt any encrypted messages he receives. One way for U to determine this root is to calculate $$r = a^{\frac{M+5-(P+Q)}{8}} \mod M$$

Such an r will exist as $$\left(\frac{a}{M}\right) = +1, \left(\frac{a}{P}\right) = \left(\frac{a}{Q}\right) \text{(see footnote}^1\text{)},$$

and so either a is a square modulo both P and Q, and hence is a square modulo M, or else −a is a square modulo P, Q and hence M. The latter case arises because by construction P and Q are both congruent to 3 mod 4 and so $$\left(\frac{-1}{P}\right) = \left(\frac{-1}{Q}\right) = -1.$$

Thus either a or −a will be square modulo P and Q.

1: Note: the Jacobi symbol $$\left(\frac{x}{M}\right)$$

is the product of the two square modulo symbols $$\left(\frac{x}{P}\right)$$

and $$\left(\frac{x}{Q}\right) \text{(where } M = PQ\text{)},$$

Thus it is either +1 if either x is a square modulo both P and Q or is a non square modul both P and Q. A useful feature of the Jacobi symbol is that it can be calculated without knowledge of the factorisation of M (see, for example, H. Cohen *A Course in Computation Algebraic Number Theory* Springer Verlag graduate texts in mathematics 138, 1993).

Figure 2:
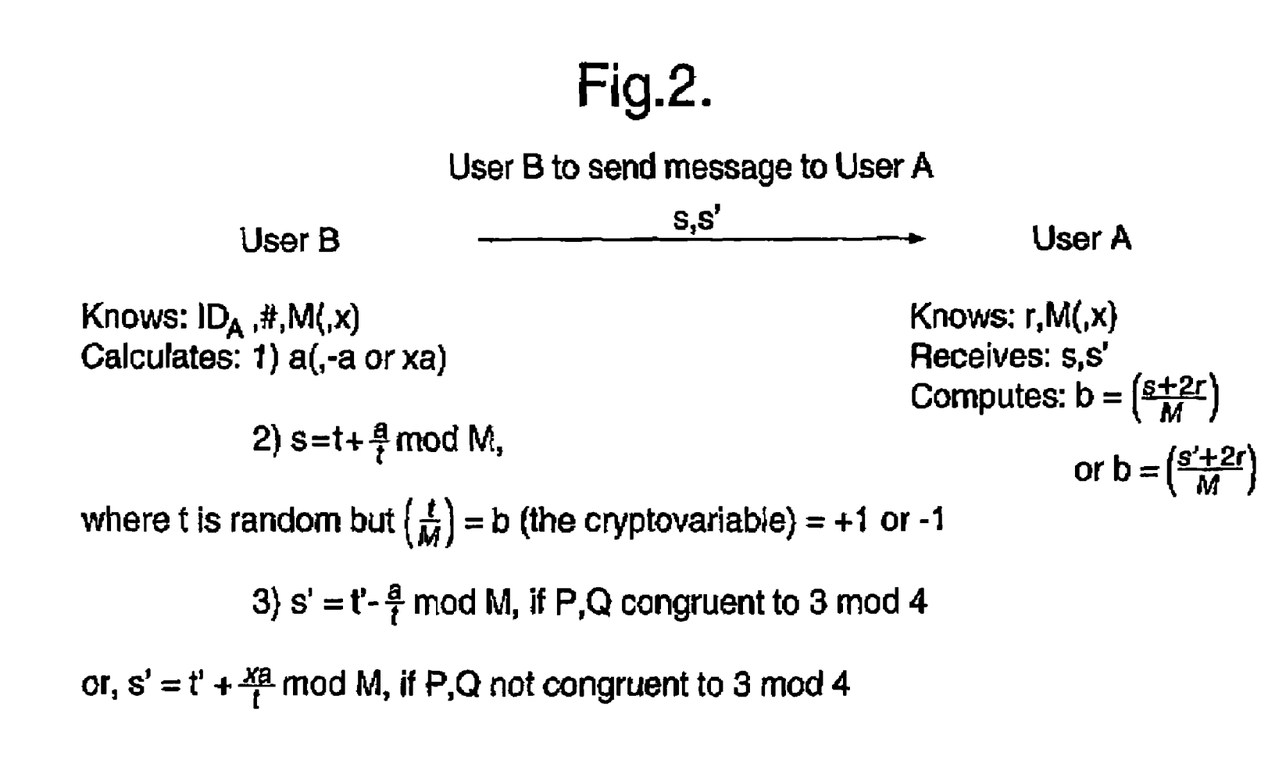
FIG. 2 is a functional representation of the encryption transmission and decryption process

II) (FIG. 2) A second user B who wishes to send encrypted data to user A first must know the hash function, the public modulus M and the identity of A. B then computes a and encrypts a bit of data b to A as s=(t+a/t)mod M, where t is a random number modulo M such that $$\left(\frac{t}{M}\right) = b$$

and b is coded as either +1 or −1. User B then transmits s to user A. If user B does not know if A has a root of +a or −a then he will need to replicate the above transmission of the encrypted bit b by choosing a different random number modulo M, t', where $$\left(\frac{t'}{M}\right) = \left(\frac{t}{M}\right) = b$$

and then transmitting $$s' = \left(t' - \frac{a}{t'}\right) \bmod M$$

in an identical fashion to A. It should be noted that user B cannot use the same value of t to transmit $$s' = \left(t - \frac{a}{t}\right) \bmod M$$

since it would be possible for someone to decrypt an intercepted message by calculating s+s'=2t and therefore b. When used practically, a message sent by the user B will comprise a message header followed by the subject of the message. The header will be encrypted using the above technique and will contain instructions as to how to decode the subject of the message which will be encrypted using a standard encryption technique. The main issue regarding practicality is the bandwidth requirement, as each bit of the message header cryptovariable requires a number of size up to M to be sent. For a 120 bit cryptovariable and using a 1024 bit modulus M, B will need to send 15 Kbytes of keying material. If B does not know whether A has received the square root of a or of −a then he will have to double this. Nevertheless for offline email use this may be an acceptable overhead.

III) A then needs to recover the bit b. Since s+2r=t(1+r/t)*(1+r/t)mod M it follows that the Jacobi symbol $$\left(\frac{s+2r}{M}\right) = \left(\frac{t}{M}\right) = b \text{ (see footnote}^2\text{)}.$$

As A knows the value of r he can calculate the Jacobi symbol $$\left(\frac{s+2r}{M}\right)$$

and hence recover b. If A $$2: t\left(1+\frac{r}{t}\right)*\left(1+\frac{r}{t}\right) = t + \frac{r^2}{t} + 2r \text{ but } r \text{ is a root of } a, \text{ so } r^2 = a$$

$$\therefore \quad = t + \frac{a}{t} + 2r \quad \text{since } s = (t + a/t)$$

$$= s + 2r$$

Now, $$\left(\frac{s+2r}{M}\right) = \left(\frac{t}{M}\right)\left(\frac{1+\frac{r}{t}}{M}\right)\left(\frac{1+\frac{r}{t}}{M}\right)$$

and since the Jacobi Symbol is either +1 or −1, then $$\left(\frac{s+2r}{M}\right) = \left(\frac{t}{M}\right).$$

Le. User A can recover the value $$f\left(\frac{t}{M}\right)$$

and therefore the bit b without knowledg ft. holds the root of −a as opposed to +a then A will need to calculate $$\left(\frac{s'+2r}{M}\right) = \left(\frac{t'}{M}\right)$$

in order to recover b.

EXAMPLE 2

The universal authority U generates a universally available public modulus M which is again the product of two primes P and Q, which are known by U only. However, P and Q are not chosen to be both congruent to 3 mod 4. In this case either one of P or Q will be chosen to be congruent to 3 nod 4 and the other congruent to 1 mod 4 or both P and Q will be chosen to be congruent to 1 mod 4. The example described above will be valid with the following modifications:

1) The universal authority U will need to find an integer x such that x is not a square modulo P and Q. Integer x will need to be published along with M and the hash function.
2) Using the secure one-way hash function as before U then calculates a value a modulo M such that the Jacobi symbol $$\left(\frac{a}{M}\right)$$

User A will receive a square root of either a or xa and such a root can be calculated by a standard technique as described in Cohen. This step corresponds to receiving a square root of a or −a in the case when P and Q are congruent to 3 mod 4.
3) Now when B sends data to A, for each bit b that he wishes to send, he chooses values t and t' for which the Jacobi symbols (t/M) and (t'/M) are +1 or −1 depending on the bit b to be sent. He then sends s=(t+a/t)mod M to A and also s'=(t'+xa/t')mod M to A.
4) A then recovers the bit b as in example 1, i.e. if he has the square root of a then he recovers b by working out $$\left(\frac{s+2r}{M}\right)$$

and if he has the square root of xa then he recovers b by working out $$\left(\frac{s'+2r}{M}\right).$$

EXAMPLE 3

The universal authority U generates a universally available public modulus M which is again the product of two non-even primes P and Q, which are known by U only.

The universal authority U will need to find an integer x such that x is not a square modulo P and Q. Integer x will need to be published along with M and the hash function.

Using the secure one-way hash functions as before U then calculates a value a modulo M such that the Jacobi symbol $$\left(\frac{a}{M}\right)$$

is +1. User A will receive a square root of either a or xa and such a root can be calculated by a standard technique as described in Cohen.

U publishes whether A has received a root of +a, −a or xa; B computes a and:

(I) if A has received a root of +a: transmits a bit cryptovariable b to A encrypted as s=(t+a/t)mod M, where t is a random number modulo M such at the Jacobi symbol $$\left(\frac{t}{M}\right)=b$$

and b is coded as either +1 or −1;

(II) if A has received a root of −a: transmits a bit cryptovariable b to A encrypted as s'=(t−a/t)mod M, where t is a random number modulo M such that the Jacobi symbol $$\left(\frac{t}{M}\right)=b$$

and b is coded as either +1 or −1;

(III) if A has received a root of xa: transmits a bit cryptovariable b to A encrypted as $$s'' = \left(t + \frac{xa}{t}\right) \mod M,$$

where t is a random number modulo M such that the Jacobi symbol $$\left(\frac{t}{M}\right)=b$$

and b is coded as either +1 or −1;

A then recovers the bit b as in example 1, i.e. if he has the square root of a then he recovers b by working out $$\left(\frac{s+2r}{M}\right)$$

and if he has the square root of −a then he recovers b by working out $$\left(\frac{s'+2r}{M}\right)$$

and if he has the square root of xa then he recovers b by working out $$\left(\frac{s''+2r}{M}\right).$$

Conveniently, the identity of each user will be his publicly known email address and for additional encryption security the current date can be added. As will be apparent to those in the art, further security can be provided to the system by splitting the responsibility for generation of the public modulus among several universal authorities.

In a particularly advantageous arrangement, aimed to reduce the overall bandwidth of messages without compromising their security, the secure encryption of the present invention may be applied only to message headers accompanying messages encrypted in accordance with a known standard encryption. The key to decrypting the message would then be provided within the message headers.

The invention claimed is:

1. A method of operating an identity based directoryless key-code cryptographic communication system comprising two users A and B and a universal authority U, involving the generation of a public modulus M, being the product of two primes P and Q which are both congruent to 3 mod 4, and the operation of a publicly available secure one-way hash function #, comprising the following steps:
   i) having U determine the public modulus M;
   ii) having U apply the #A's identity to produce a value a modulo M such that the Jacobi symbol $$\left(\frac{a}{M}\right)$$

is +1 and then to calculate the square root modulo M of a or −a and supply a resulting root, r, to A;
   iii) having B compute a and transmit a bit of cryptovariable b to A encrypted as s=(t+a/t)mod M, where t is a random number modulo M such that the Jacobi symbol $$\left(\frac{t}{M}\right) = b$$

and b is coded as either +1 or −1;
iv) having B retransmit the bit of cryptovariable b to A encrypted as $$s' = \left(t' - \frac{a}{t'}\right) \bmod M,$$

where t' is a different random number modulo M to t such than $$\left(\frac{t'}{M}\right) = \left(\frac{t}{M}\right) = b;$$

v) having user A recover cryptovariable bit b by computing $$b = \left(\frac{s+2r}{M}\right) \text{ or } b = \left(\frac{s'+2r}{M}\right).$$

2. A method of operating an identity based directoryless key-code cryptographic communication system comprising two users A and B and a universal authority U, involving the generation of a public modulus M, being the product of two primes P and Q of which one or both are congruent to 1 mod 4, and the operation of a publicly available secure one-way hash function #, comprising the following steps:
  i) having U determine the public modulus M;
  ii) having U find and publish an integer x such that x is not a square modulo P nor Q;
  iii) having U apply the # to A's identity to produce a value a modulo M such that the Jacobi symbol $$\left(\frac{a}{M}\right)$$

is +1 and then to calculate the square root modulo M of a or xa and supply a resulting root, r, to A;
  iv) having B compute a and transmit a bit of cryptovariable b to A encrypted as s=(t+a/t)mod M, where t is a random number modulo M such that the Jacobi symbol $$\left(\frac{t}{M}\right) = b$$

and b is coded as either +1 or −1;
  v) having B retransmit the bit of cryptovariable b to A encrypted as $$s' = \left(t' + \frac{xa}{t'}\right) \bmod M,$$

where t' is a different random number modulo M to t such that $$\left(\frac{t'}{M}\right) = \left(\frac{t}{M}\right) = b;$$

vi) having A recover cryptovariable bit b by computing $$b = \left(\frac{s+2r}{M}\right) \text{ or } b = \left(\frac{s'+2r}{M}\right).$$

3. A method of operating an identity based directoryless key-code cryptographic communication system comprising two users A and B and a universal authority U, involving the generation of a public modulus M, being the product of any two noneven primes P and Q, and the operation of a publicly available secure one-way hash function #, comprising the following steps:
  i) having U determine the public Modulus M;
  ii) having U apply the # to A's identity to produce a value a Modulo M such that the Jacobi symbol $$\left(\frac{a}{M}\right)$$

is +1 and then to calculate the square root modulo M of a, −a or xa where x, which is an additional publicly available system parameter, is an integer which is neither square modulo P nor Q, and to supply a resulting root, r, to A;
  iii) having U publish whether A has received a root of +a, −a or xa;
  iv) having B compute a and:
    (I) if A has received a root of +a: transmit a bit of cryptovariable b to A encrypted as s=(t+a/t)mod M, where t is a random number modulo M such that the Jacobi symbol $$\left(\frac{t}{M}\right) = b$$

and b is coded as either +1 or −1;
    (II) if A has received a root of −a: transmit a bit cryptovariable b to A encrypted as s'=(t−a/t)mod M, where t is a random number modulo M such that the Jacobi symbol $$\left(\frac{t}{M}\right) = b$$

and b is coded as either +1 or −1;
    (III) if A has received a root of xa: transmit a bit cryptovariable b to A encrypted as $$s'' = \left(t + \frac{xa}{t}\right) \bmod M,$$

where t is a random number modulo M such that the Jacobi symbol $$\left(\frac{t}{M}\right) = b$$

and b is coded as either +1 or −1;

vi) having A recover cryptovariable bit b by computing $$b = \left(\frac{s + 2r}{M}\right) \qquad \text{(I)}$$

$$b = \left(\frac{s' + 2r}{M}\right) \qquad \text{(II)}$$

$$b = \left(\frac{s'' + 2r}{M}\right). \qquad \text{(III)}$$

4. A method of operating an identity based directoryless key-code cryptographic communication system as claimed in claim 1 wherein user A is identified by his email address.

5. A method of operating an identity based directoryless key-code cryptographic communication system as claimed in claim 1 wherein A's identity includes the date to increase the security of the system.

6. A method of operating an identity based directoryless key-code cryptographic communication system as claimed in claim 1 wherein the generation of the public modulus is split between a plurality of universal authorities acting in co-operation.

7. A method of operating an identity based directoryless key-code cryptographic communication system, comprising a message header section encrypted according to the method claimed in claim 1 and the transmission message encrypted using a standard encryption technique, the decryption key to the transmission message being in the header section.

8. An identity based directoryless key-code cryptographic system comprising a communications channel accessible by an encryption microprocessor and a decryption microprocessor operably coupled to exchange data and operably connectable to the communications channel wherein the microprocessors are programmed to co-operate according to the method claimed in claim 1.

* * * * *